(12) United States Patent
Matsuda et al.

(10) Patent No.: US 12,044,042 B2
(45) Date of Patent: Jul. 23, 2024

(54) DOOR OPENING DEVICE

(71) Applicant: MITSUI KINZOKU ACT CORPORATION, Yokohama (JP)

(72) Inventors: Yosuke Matsuda, Yokohama (JP); Tatsuya Takayama, Yokohama (JP); Takao Taga, Yokohama (JP)

(73) Assignee: Mitsui Kinzoku Act Corporation (JP)

( * ) Notice: Subject to any disclaimer, the term of this patent is extended or adjusted under 35 U.S.C. 154(b) by 164 days.

(21) Appl. No.: 17/609,453

(22) PCT Filed: Apr. 2, 2020

(86) PCT No.: PCT/JP2020/015243
§ 371 (c)(1),
(2) Date: Nov. 8, 2021

(87) PCT Pub. No.: WO2021/002073
PCT Pub. Date: Jan. 7, 2021

(65) Prior Publication Data
US 2022/0228405 A1    Jul. 21, 2022

(30) Foreign Application Priority Data

Jul. 3, 2019  (JP) ................................. 2019-124640

(51) Int. Cl.
*E05B 79/06*    (2014.01)
*E05B 79/20*    (2014.01)
*E05B 79/22*    (2014.01)

(52) U.S. Cl.
CPC .............. *E05B 79/06* (2013.01); *E05B 79/20* (2013.01); *E05B 79/22* (2013.01)

(58) Field of Classification Search
CPC .......... E05B 79/06; E05B 79/20; E05B 79/22; E05B 85/243; E05B 85/18; E05B 83/38; B60J 5/00; B60J 5/04
See application file for complete search history.

(56) References Cited

U.S. PATENT DOCUMENTS 10,604,973 B2 *  3/2020  Tamura .................. E05B 83/38

FOREIGN PATENT DOCUMENTS

| JP | 2004-308183 A | 11/2004 |
|---|---|---|
| JP | 4206288 B2 | 1/2009 |
| JP | 2017-043990 A | 3/2017 |

* cited by examiner

*Primary Examiner* — Michael P Ferguson
*Assistant Examiner* — Thomas L Neubauer
(74) *Attorney, Agent, or Firm* — Foley & Lardner LLP

(57) ABSTRACT

A door opening device for an access door includes an upper lock device, a lower lock device, and a handle device, the lower lock device has a first bias member for biasing a lower opening lever in an opposite direction to an unlocking direction, the handle device has a handle into which an unlocking operation is inputted, a first lever to which an upper cable and a lower cable are connected, a second lever which rotates in a first direction in response to an unlocking operation and transmits this rotation to the first lever, and a second bias member for restoring the second lever to an initial position, and the second lever has a play stroke defined between a point in time when the second lever starts to rotate from the initial position to a point in time when the second lever transmits the rotation to the first lever.

7 Claims, 8 Drawing Sheets

[FIG. 1]
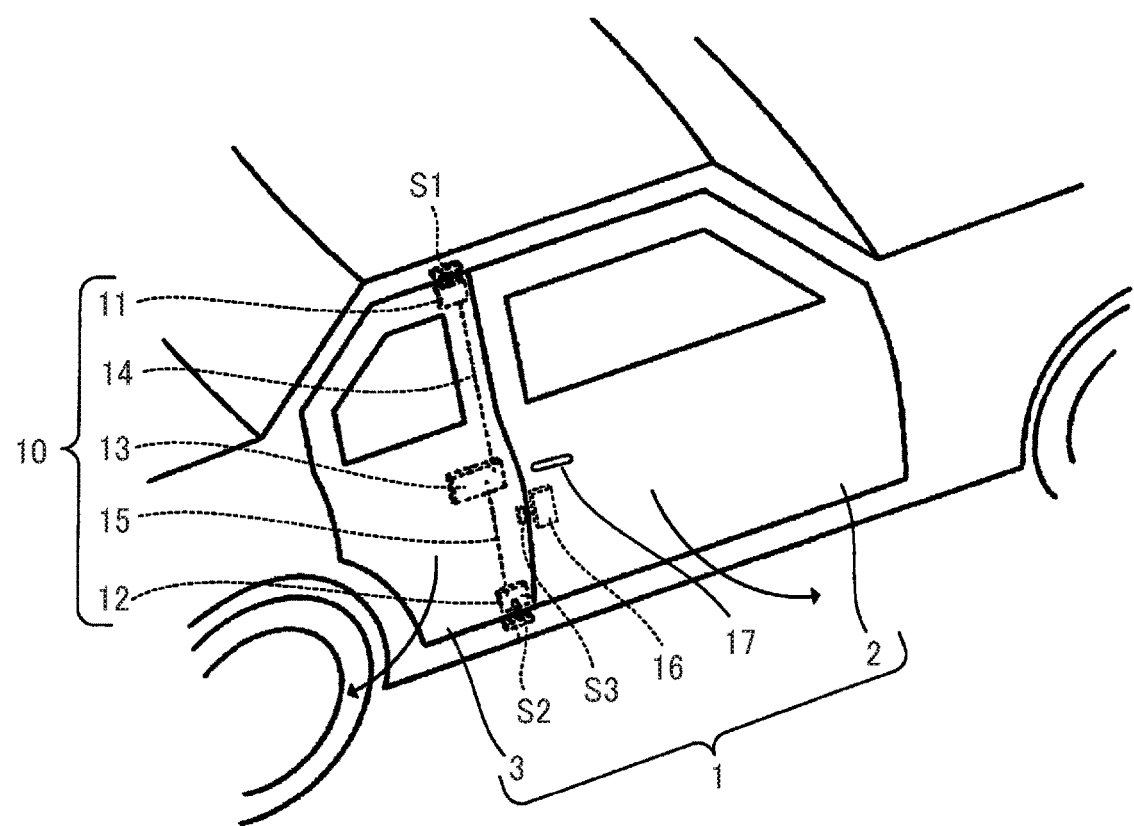

[FIG. 2]
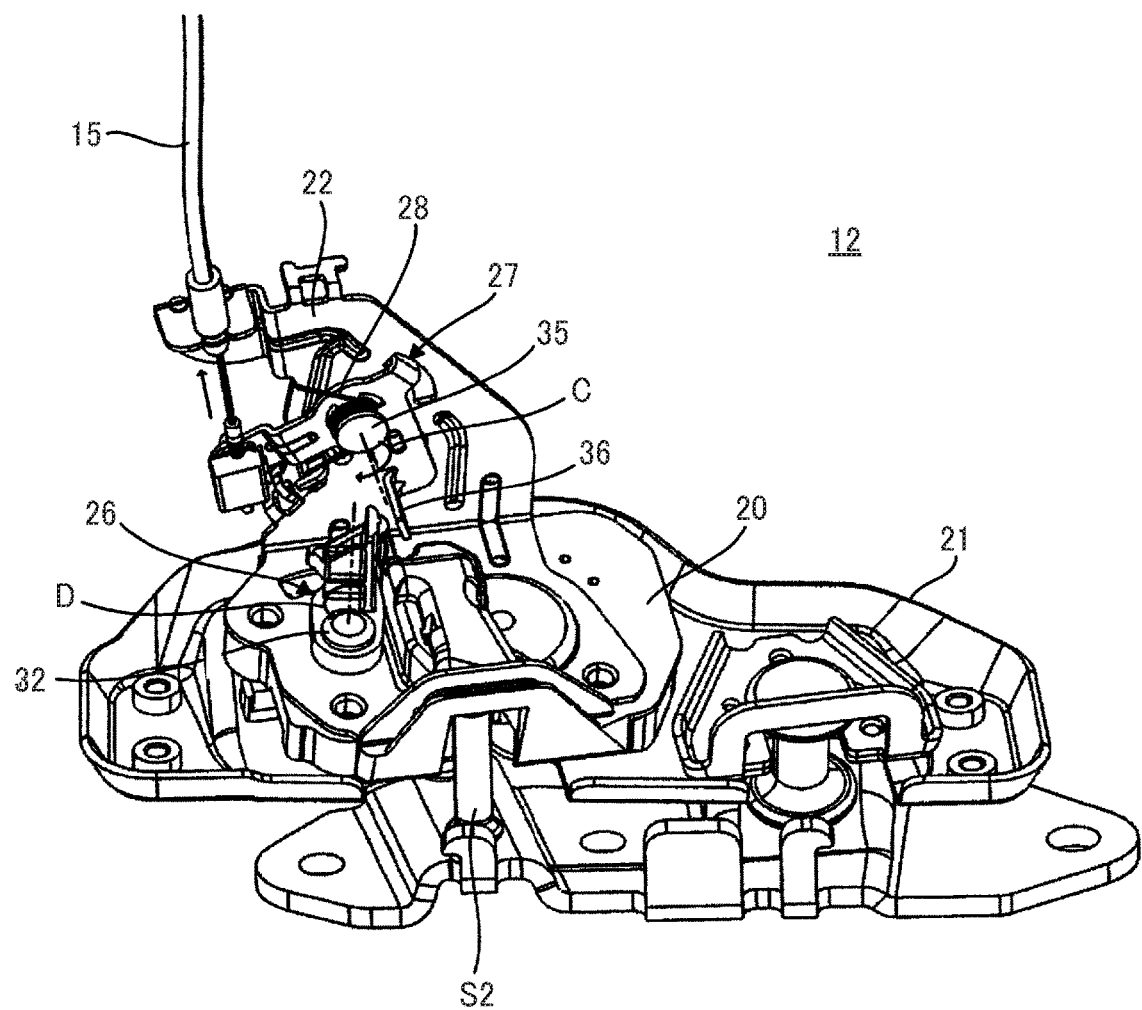

[FIG. 3]
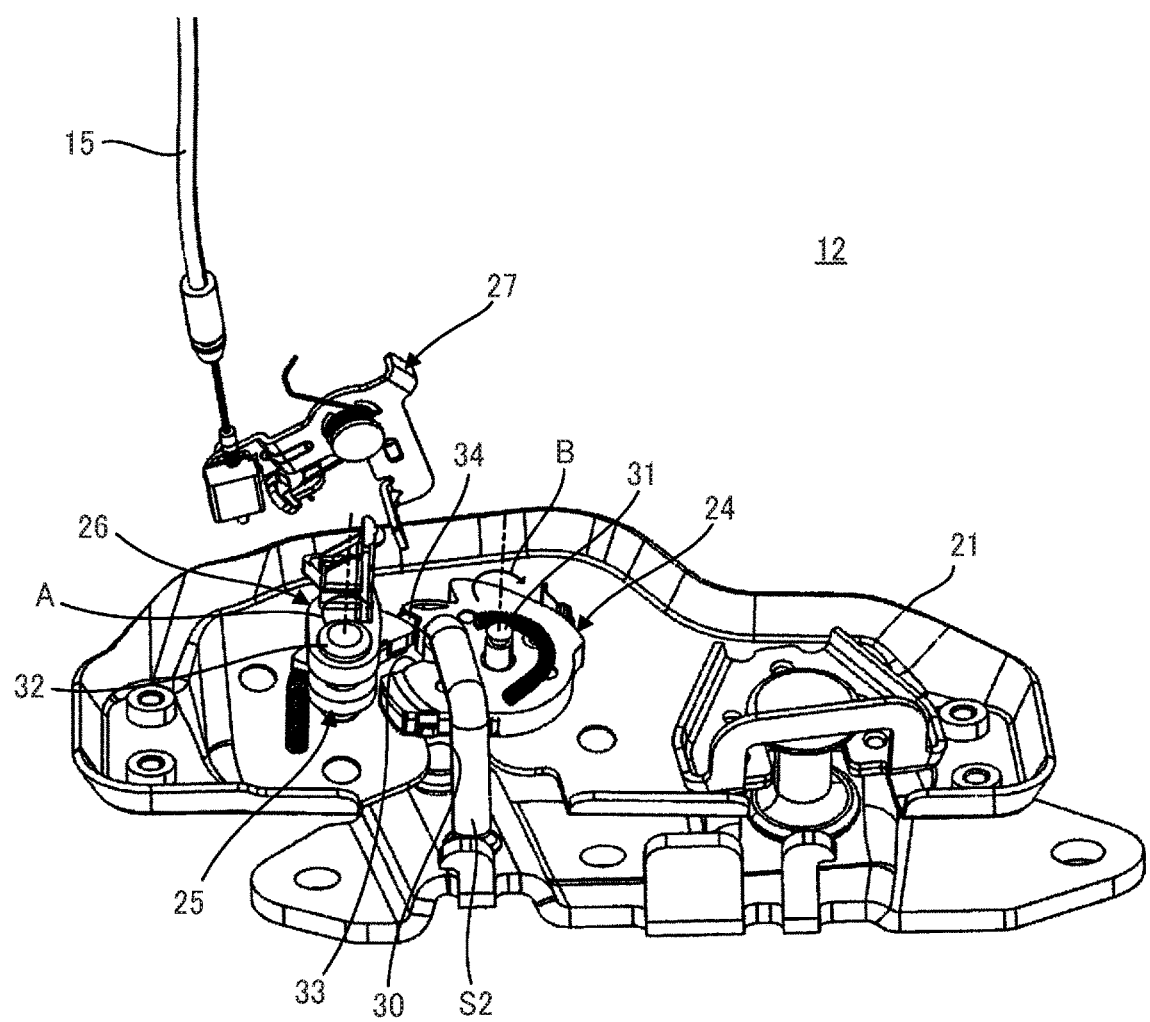

[FIG. 4]
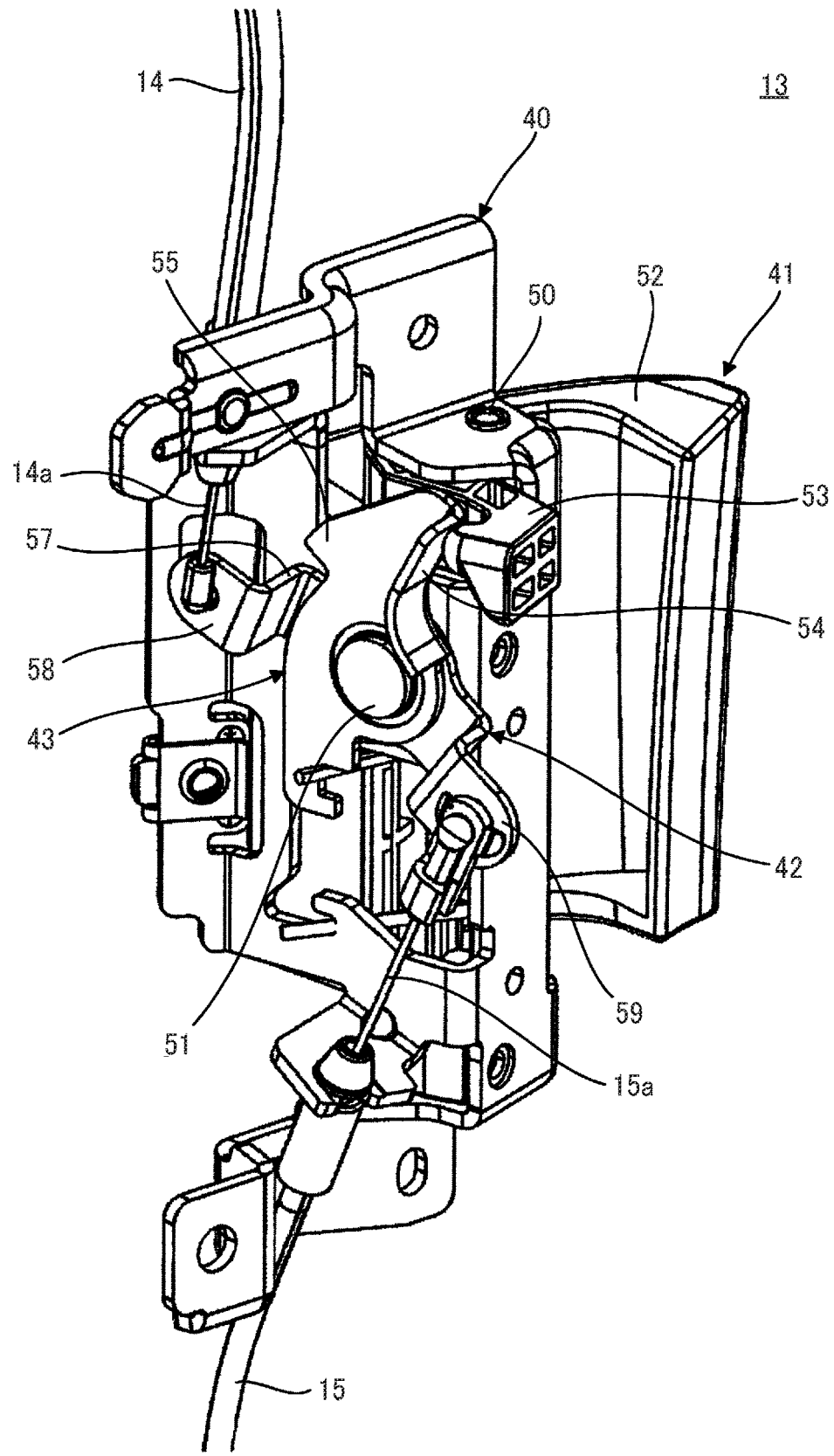

[FIG. 5]
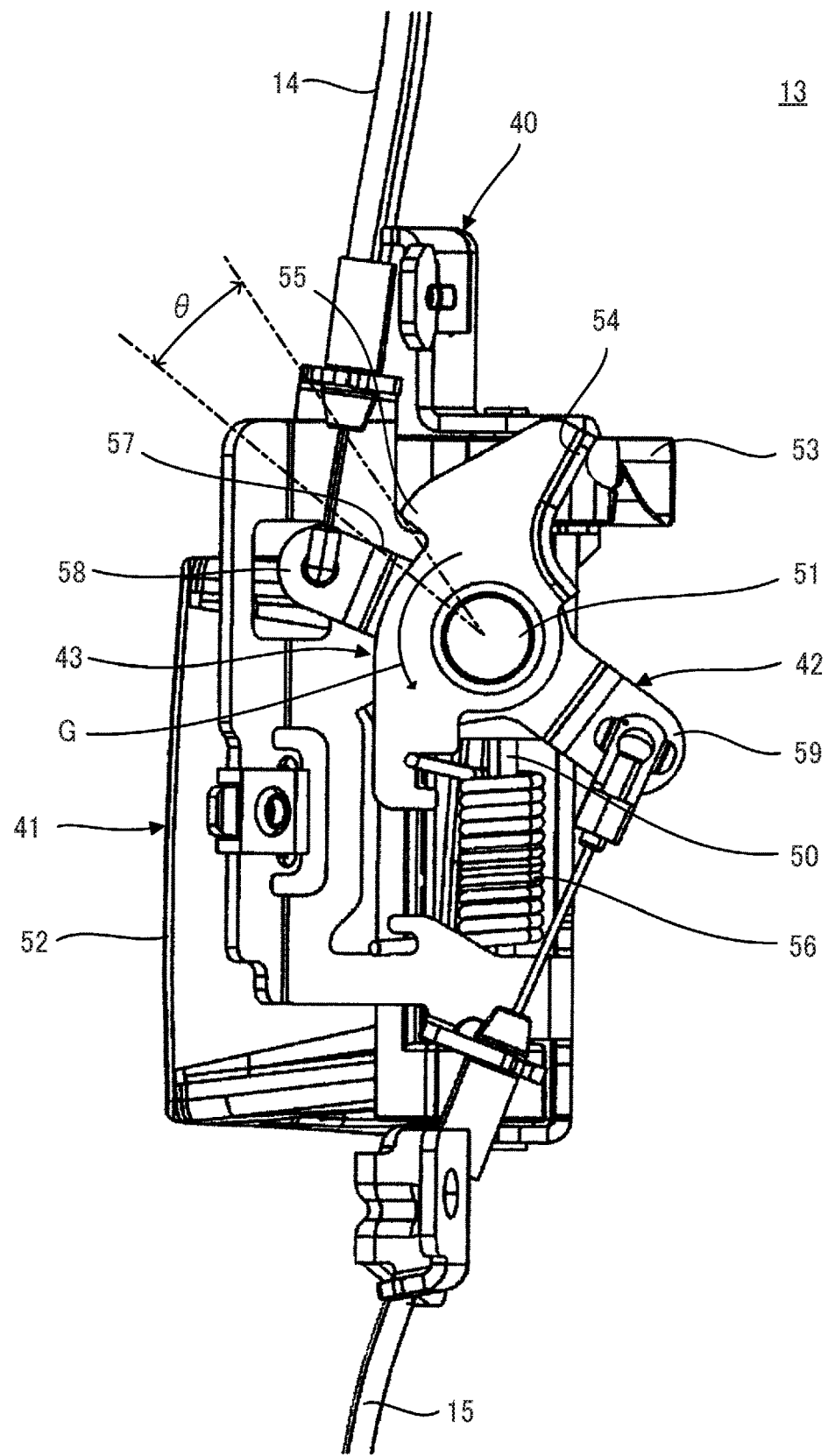

[FIG. 6]
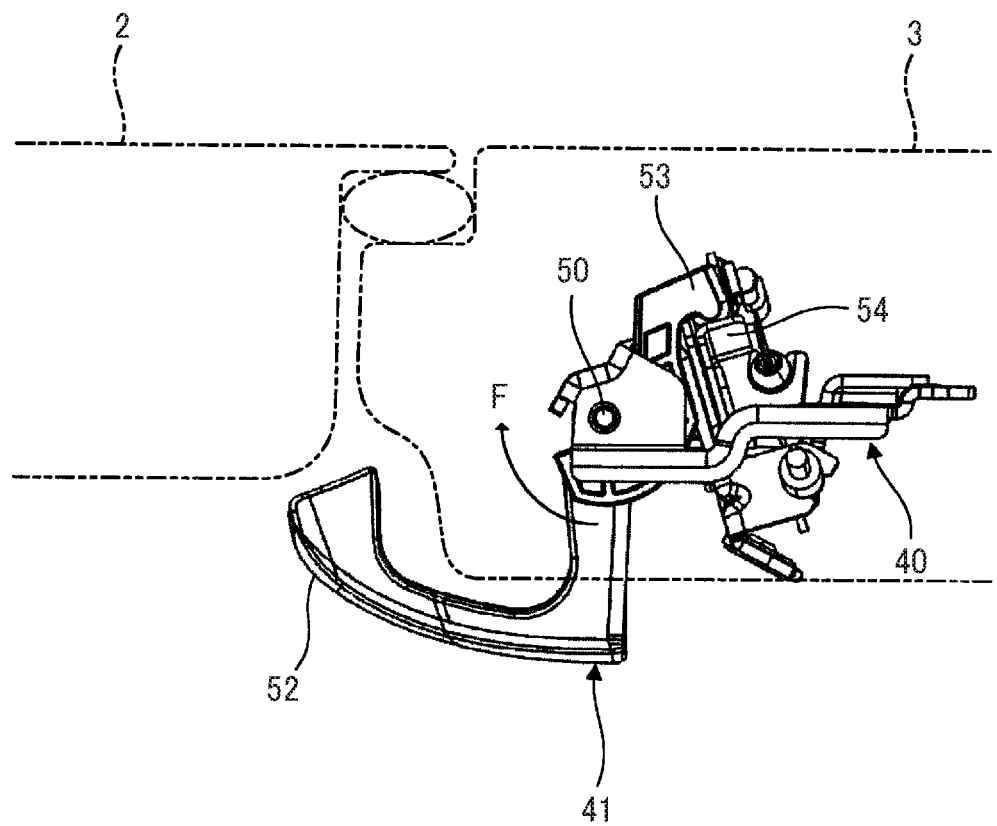

[FIG. 7]
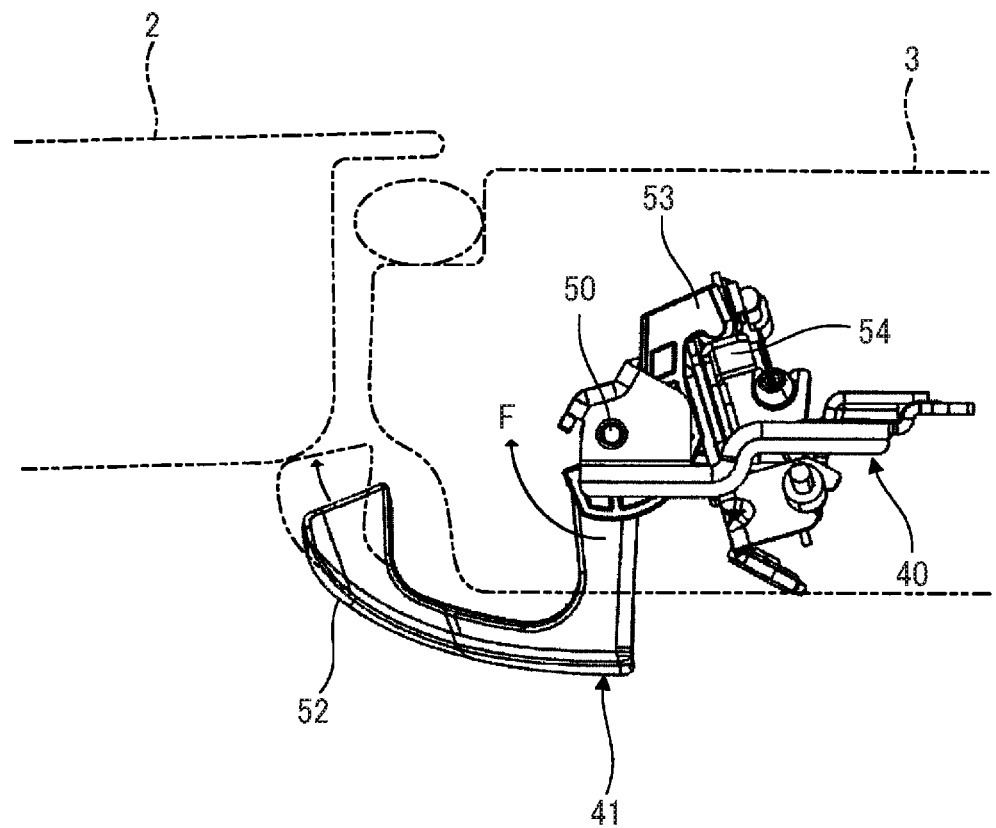

[FIG. 8]
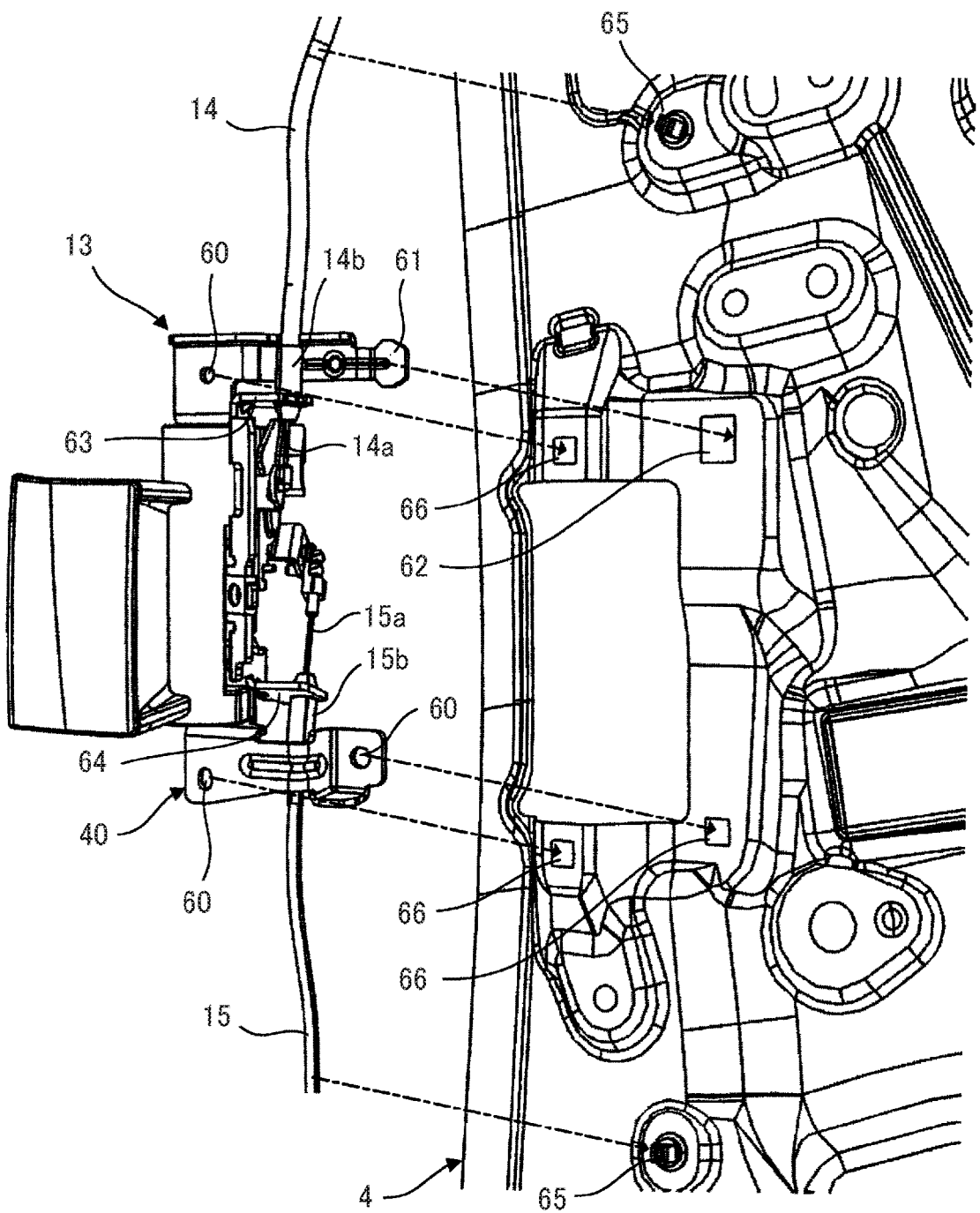

DOOR OPENING DEVICE

CROSS-REFERENCE TO RELATED APPLICATIONS

The present application claims priority under 37 U.S.C. § 371 to International Patent Application No. PCT/JP2020/015243, filed Apr. 2, 2020, which claims priority to and the benefit of Japanese Patent Application No. 2019-124640, filed on Jul. 3, 2019. The contents of these applications are hereby incorporated by reference in their entireties.

TECHNICAL FIELD

The present invention relates to a door opening device for an access door.

BACKGROUND ART

As a side door of a vehicle such as an automobile, there is known a side door including a swing door which is swung to be opened and closed about a longitudinal front end portion thereof as an axis and an access door which is provided adjacent to a longitudinal rear side of the swing door and is opened and closed about a longitudinal rear end portion thereof as an axis.

A side door described in PTL 1 includes a front door (a swing door) and a rear door (an access door). The rear door is fastened in a closed state by an upper lock device which can be locked by locking an upper striker provided on a body roof portion and a lower lock device which can be locked by locking a lower striker provided a body floor portion. Then, the front door is fastened in a closed state by a lock device which can be locked by locking a striker provided at a front end portion of the rear door.

The lock device, which fastens the front door in the closed state, can be unlocked by operating a handle on the front door. In addition, the upper lock device and the lower lock device, which fasten the rear door in the closed state, can be unlocked by operating a handle device on the rear door. This handle device has an opening handle provided on a transversely inner side of the rear door and a lever connected with the upper lock device and the lower lock device by way of cables, and the lever is rotated in response to an unlocking operation inputted into the opening handle. The cables are pulled as the lever is rotated, as a result of which the upper lock device and the lower lock device are actuated, whereby the upper lock device and the lower lock device are unlocked.

CITATION LIST

Patent Literature

PTL 1: Japanese Patent No. 4206288

SUMMARY OF INVENTION

Technical Problem

In the side door described in PTL 1, in a case that an unlocking operation is inputted into the opening handle with the front door closed, the opening handle is brought into abutment with the front door to thereby restrict the unlocking operation. As a result, the upper lock device and the lower lock device do not react to the unlocking operation, whereby the upper lock device and the lower lock device are left locked. That is, there is no case in which the rear door is opened alone, and hence, the rear door is basically opened with the front door opened.

However, with the front door left ajar or in a half locked state, the restriction of the unlocking operation becomes less severe. In this case, when vibrations of the vehicle are allowed to act on the upper lock device and the lower lock device, the upper lock device and the lower lock device are actuated, leading to a risk of the upper lock device and the lower lock device being unlocked. In order to prevent the occurrence of unexpected unlocking like this, it is considered, for example, to form a connecting portion of the lever with the cables into an elongated hole so as to set a play allowing the lever to rotate without pulling the cables. However, this can produce a slack in the cables. When the cables slacken, abnormal noise can be produced in the upper lock device and the lower lock device, as well as the handle device to which the cables are connected.

The present invention provides a door opening device for an access door which can prevent an unexpected unlocking while suppressing the generation of abnormal noise.

Solution to Problem

A door opening device according to one illustrative aspect of the present invention is a door opening device for an access door that is provided adjacent to a longitudinal rear side of a swing door opened and closed about a longitudinal front end portion thereof as an axis and is configured to be opened and closed about a longitudinal rear end portion thereof as an axis with the swing door left open, the door opening device including: an upper lock device configured to lock an upper striker provided on a body roof portion and having an upper opening lever configured to unlock the locked upper lock device; a lower lock device configured to lock a lower striker provided on a body floor portion and having a lower opening lever configured to unlock the locked lower lock device; and a handle device configured to actuate the upper opening lever and the lower opening lever in an unlocking direction by way of an upper cable and a lower cable, the upper cable being connected to the upper opening lever, and the lower cable being connected to the lower opening lever, wherein the upper lock device and/or the lower lock device includes a first bias member configured to bias the upper opening lever and/or the lower opening lever in an opposite direction to the unlocking direction, wherein the handle device includes: a handle, an unlocking operation to actuate the upper opening lever and the lower opening lever in the unlocking direction being inputted into the handle; a first lever, the upper cable and the lower cable being connected to the first lever; a second lever configured to rotate in a first direction in response to the unlocking operation and to transmit the rotation to the first lever; and a second bias member configured to bias the second lever in a second direction opposite to the first direction to thereby restore the second lever to an initial position, and wherein the second lever has a play stroke defined between a point in time when the second lever starts to rotate from the initial position and a point in time when the rotation is transmitted to the first lever.

Advantageous Effects of Invention

According to the present invention, the door opening device for an access door can be provided which can prevent an unexpected unlocking while suppressing the generation of abnormal noise.

BRIEF DESCRIPTION OF DRAWINGS

FIG. 1 is a schematic diagram of an example of a door opening device to describe an embodiment of the present invention.

FIG. 2 is a perspective view of a lower lock device of the door opening device shown in FIG. 1.

FIG. 3 is a perspective view of the lower lock device shown in FIG. 2 with a part thereof omitted from illustration.

FIG. 4 is a perspective view of a handle device of the door opening device shown in FIG. 1.

FIG. 5 is a side view of the handle device shown in FIG. 4.

FIG. 6 is a plan view of the handle device shown in FIG. 4.

FIG. 7 is a plan view showing an operation of the handle device shown in FIG. 4.

FIG. 8 is an exploded perspective view showing a fixing structure of the handle device shown in FIG. 4.

DESCRIPTION OF EMBODIMENTS

A side door 1 of a vehicle shown in FIG. 1 includes a swing door 2 and an access door 3 provided adjacent to a longitudinal rear side of the swing door 2. The swing door 2 is opened and closed about a longitudinal front end portion thereof as an axis, and the access door 3 is opened and closed about a longitudinal rear end portion thereof as an axis. A door opening device 10 is provided on the access door 3 and causes the access door 3 to be opened and closed.

The door opening device 10 includes an upper lock device 11, a lower lock device 12, and a handle device 13. The upper lock device 11 is placed at an upper end portion of the access door 3 and can be locked by locking an upper striker S1 provided on a body roof portion. The lower lock device 12 is placed at a lower end portion of the access door 3 and can be locked by locking a lower striker S2 provided on a body floor portion. Then, the access door 3 is fastened in a closed state as a result of the upper lock device 11 and the lower lock device 12 being locked by locking the upper striker S1 and the lower striker S2, respectively. The handle device 13 is placed at a front end portion of the access door 3. The handle device 13 is connected to the upper lock device 11 by way of an upper cable 14 and is connected to the lower lock device 12 by way of a lower cable 15 so as to unlock the upper lock device 11 and the lower lock device 12.

A lock device 16 and a door handle 17 are provided on the swing door 2. The lock device 16 is placed at a rear end portion of the swing door 2 and can be locked by locking a striker S3 provided at the front end portion of the access door 3. A full latching state and a half latching state are set as locking states of the striker S3. In a case that the lock device 16 is locked in the full latching state, the swing door 2 is fastened in a fully closed state, whereas in a case that the lock device 16 is locked in the half latching state, the swing door 2 is fastened in an ajar or half locked state. The handle 17 is placed on a transversely outer side of the swing door 2 and is connected with the lock device 16 by way of a cable, not shown, whereby the handle 17 can unlock the lock device 16.

FIGS. 2 and 3 show the lower lock device 12.

The lower lock device 12 includes a body 20, a cover plate 21, a back plate 22, a latch 24, a ratchet 25, a relay lever 26, and an opening lever 27. In FIG. 3, the body 20 and the back plate 22 are omitted from illustration.

The body 20 is made from a resin material, while the cover plate 21 and the back plate 22 are made of a metallic material, and the cover plate 21 and the back plate 22 are assembled to the body 20 with the body 20 interposed therebetween. A striker groove 30 is provided in the cover plate 21, so that the lower striker S2 enters the striker groove 30 in response to a closing action of the access door 3, whereas the lower striker S2 exits from the striker groove 30 in response to an opening action of the access door 3.

The latch 24 and the ratchet 25 are accommodated between the body 20 and the cover plate 21. The latch 24 is supported rotatably by a latch shaft 31 provided on the cover plate 21 in such a manner as to be erected therefrom, and the ratchet 25 is supported rotatably by a ratchet shaft 32 provided on the cover plate 21 in such a manner as to be erected therefrom. The latch 24 has an engagement groove 33, which is brought into engagement with the lower striker S2, and can rotate between an unlatching position where an opening portion of the engagement groove 33 is disposed so as to match the striker groove 30 and a latching position where the opening portion of the engagement groove 33 is disposed so as to deviate from the striker groove 30. The ratchet 25 has an engagement portion 34 which is brought into engagement with the opening portion of the engagement groove 33 of the latch 24 when the latch 24 is disposed in the latching position. The rachet 25 is rotatable between a locking position where the engagement portion 34 is brought into engagement with the opening portion of the engagement groove 33 and an unlocking position where the engagement portion 34 is brought into disengagement from the opening portion of the engagement groove 33. The ratchet 25 is biased in the direction of an arrow A from the unlocking position towards the locking position by means of a spring.

The lower striker S2 enters the striker groove 30 in the cover plate 21 in association with a closing action of the access door 3 and is then accommodated in the engagement groove 33 in the latch 24. When it is accommodated in the engagement groove 33, the lower striker S2 presses against the latch 24, whereby the latch 24 so pressed rotates in an opposite direction to the direction of the arrow A from the unlatching position towards the latching position. When the latch 24 is disposed in the latching position, the opening portion of the engagement groove 33 is closed by one side wall of the striker groove 30, whereby the lower striker S2 cannot exit from the engagement groove 33. As a result, the lower striker S2 is locked by the latch 24.

Then, when the latch 24 is disposed in the latching position, the ratchet 25 rotates in the direction of an arrow B from the unlocking position towards the locking position, whereby the opening portion of the engagement groove 33 is brought into engagement with the engagement portion 34 of the ratchet 25. The rotation of the latch 24 from the latching position towards the unlatching position is prevented as a result of the engagement of the opening portion of the engagement groove 33 with the engagement portion 34. As a result, the latch 24 is locked in such a state that the latch 24 locks the lower striker S2, whereby the access door 3 is fastened in the closed state.

The relay lever 26 is supported rotatably by the ratchet shaft 32 on the back plate 22 and is disposed concentrically with the ratchet 25, rotating together with the ratchet 25. The opening lever 27 is supported rotatably by a lever shaft 35 provided on the back plate 22 in such a manner as to be erected therefrom. The opening lever 27 has an engagement portion 36 configured to be brought into engagement with the relay lever 26 at one end portion thereof and can rotate between an initial position where the engagement portion 36 is disposed apart from the relay lever 26 and an unlocking position where the engagement portion 36 is brought into engagement with the relay lever 26 and presses against the relay lever 26. One end of the lower cable 15 is fixed to the other end portion of the opening lever 27.

In a case that an unlocking operation is performed on the handle device 13 with the access door 3 fastened in the closed state, the lower cable 15 is pulled towards the handle device 13, whereby the opening lever 27, to which the one end of the lower cable 15 is fixed, rotates in the direction of an arrow C (an unlocking direction) from the initial position towards the unlocking position. The engagement portion 36 is brought into engagement with the relay lever 26 in association with the rotation of the opening lever 27, whereby the opening lever 27 presses against the relay lever 26. Then, the relay lever 26 so pressed against rotates in the direction of an arrow D, and the ratchet 25 also rotates in the direction of the arrow D together with the relay lever 26 to move from the locking position to the unlocking position. As a result, the engagement portion 34 of the ratchet 25 is brought into disengagement from the opening portion of the engagement groove 33 in the latch 24, whereby the latch 24 can rotate from the latching position towards the unlatching position. This allows the latch 24 to unlock the lower striker S2.

Although its illustration is omitted here, the upper lock device 11 is basically configured similar to the lower lock device 12. That is, the upper lock device 11 includes a latch, a ratchet, and an opening lever. One end of the upper cable 14 is fixed to the opening lever. In a case that the unlocking operation is performed on the handle device 13, the upper cable 14 is pulled towards the handle device 13, whereby the opening lever rotates from an initial position to an unlocking position. The ratchet rotates in association with the rotation of the opening lever, and the ratchet moves from a locking position to an unlocking position. This allows the latch to unlock the upper striker S1.

Then, at least one of the upper lock device 11 and the lower lock device 12 has a first bias member for biasing the opening lever towards the initial position, and in this embodiment, the lower lock device 12 has a torsion spring 28 as the first bias member. The upper lock device 11 may have the first bias member in place of the lower lock device 12, or the upper lock device 11 and the lower lock device 12 both may have the first bias member.

The torsion spring 28 biases the opening lever 27 in an opposite direction to the direction of the arrow C towards the initial position. In a case that no unlocking operation is performed on the handle device 13, that is, in a case that the lower cable 15 is not pulled, the opening lever 27 is retained in the initial position. Further, the biasing effort of the torsion spring 28 is transmitted to the opening lever of the upper lock device by way of the lower cable 15, the handle device 13, and the upper cable 14. As a result, the opening lever of the upper lock device is also retained in the initial position.

FIGS. 4 to 6 show the handle device 13.

The handle device 13 includes a bracket 40, a handle 41, a first lever 42, and a second lever 43. An unlocking operation to unlock the upper lock device 11 and the lower lock device 12 is inputted into the handle 41. The upper cable 14 and the lower cable 15 are connected to the first lever 42. The second lever 43 is interposed between the handle 41 and the first lever 42 and rotates in response to an unlocking operation, transmitting the rotation thereof to the first lever 42. As a result, the first lever 42 rotates, whereby the upper cable 14 and the lower cable 15 are pulled, and the upper lock device 11 and the lower lock device 12 are unlocked.

The bracket 40 is made of a metallic plate material and configures a single member formed by bending work such as folding, or cutting and raising. The bracket 40 holds a handle shaft 50 which configures a rotational shaft of the handle 41. Additionally, the bracket 40 holds a lever shaft 51 which configures a common rotational shaft for the first lever 42 and the second lever 43.

The handle 41 is supported rotatably by the handle shaft 50. The handle 41 has an operation portion 52, which is disposed on the transversely inner side of the access door 3 in such a manner as to be exposed therefrom, and a pressing portion 53, which is configured to be brought into engagement with the second lever 43. In response to an unlocking operation, the handle 41 rotates about the handle shaft 50 in the direction of an arrow F from an initial position shown in FIG. 6. The operation portion 52 is moved transversely outwards along an arc-like trajectory that is substantially parallel to a body floor at a longitudinal front side of the front end portion of the access door 3. The pressing portion 53 is also moved along an arc-like trajectory that is substantially parallel to the body floor.

The trajectory of the operation portion 52 intersects a rear end portion of the swing door 2 which is fastened in the fully closed state or the ajar or half locked state, and the operation portion 52 is brought into abutment with the rear end portion of the swing door 2 in a case that the swing door 2 is fastened in the fully closed state or the ajar or half locked state. This restricts the unlocking operation. On the other hand, with the swing door 2 left in an opened state, the rear end portion of the swing door 2 deviates from the trajectory of the operation portion 52. As a result, the unlocking operation can be completed.

The second lever 43 is supported rotatably by the lever shaft 51. The second lever 43 has a pressed or pressing target portion 54, which is configured to be brought into engagement with the handle 41, and a pressing portion 55, which is configured to be brought into engagement with the first lever 42. The pressing target portion 54 is disposed at a front side of the pressing portion 53 of the handle 41 which moves in association with an unlocking operation on the trajectory of the pressing portion 53. In association with an unlocking operation, the pressing target portion 54 is pressed by the handle 41 which rotates in the direction of the arrow F, and the second lever 43 rotates in the direction of an arrow G (a first direction) from an initial position shown in FIG. 5.

The second lever 43 is biased in an opposite direction (a second direction) to the direction of the arrow G by means of a torsion spring 56, which configures a second bias member. Further, the contact of the pressing portion 53 of the handle 41 with the pressing target portion 54 of the second lever 43 is maintained at all times, and the handle 41 is also biased by the torsion spring 56. In a case that no unlocking operation is performed, the handle 41 and the second lever 43 are both retained in their initial positions.

The first lever 42 is disposed concentrically with the second lever 43 and is supported rotatably by the lever shaft 51. The first lever 42 has a pressing target portion 57 which is configured to be brought into engagement with the second lever 43, an upper cable connecting portion 58, to which one end of a core wire of the upper cable 14 is fixed, and a lower cable connecting portion 59, to which one end of a core wire of the lower cable 15 is fixed. The pressing target portion 57 is disposed at a front side of the pressing portion 55 which moves in association with an unlocking operation on a trajectory of the pressing portion 55 of the second lever 43. In association with an unlocking operation, the pressing target portion 57 is pressed against by the second lever 43 rotating in the direction of the arrow G, and the first lever 42 also rotates in the direction of the arrow G from the initial position shown in FIG. 4.

Then, the upper cable connecting portion 58, to which one end of a core wire 14a of the upper cable 14 is fixed, moves downwards in association with the rotation of the first lever 42. In addition, the lower cable connecting portion 59, to which one end of a core wire 15a of the lower cable 15 is fixed, is provided at an opposite side to the upper cable connecting portion 58 across the lever shaft 51, and moves upwards in association with the rotation of the first lever 42. As a result, the upper cable 14 and the lower cable 15 are both pulled towards the handle device 13. As a result, the opening levers of the upper lock device 11 and the lower lock device 12 rotate in the unlocking direction from their initial positions, whereby the upper lock device 11 and the lower lock device 12 are unlocked.

Here, the opening lever 27 (refer to FIGS. 2 and 3) of the lower lock device 12 is biased in the opposite direction to the unlocking direction by the torsion spring 28 (refer to FIGS. 2 and 3). When the pulling of the lower cable 15 towards the handle device 13 is released, the opening lever 27 is automatically restored to the initial position, and the lower cable 15 is pulled back towards the lower lock device 12. As a result, in a case that no unlocking operation is performed, the first lever 42 is retained in the initial position shown in FIG. 5.

With the handle 41, the first lever 42, and the second lever 43 all disposed in their initial positions, the pressing portion 53 of the handle 41 and the pressing target portion 54 of the second lever 43 are in contact with each other. On the other hand, the pressing portion 55 of the second lever 43 and the pressing target portion 57 of the first lever 42 are spaced apart from each other. As a result, when an unlocking operation is inputted into the handle 41, the second lever 43 rotates immediately, while the first lever 42 rotates after the pressing portion 55 and the pressing target portion 57 are brought into engagement with each other by the rotation of the second lever 43. That is, the second lever 43 has a play stroke θ that is defined between: a point in time when the second lever 43 starts to rotate from its initial position; and a point in time when the rotation of the second lever 43 is transmitted to the first lever 42.

FIG. 7 shows an operation of the handle device 13 in a case that the swing door 2 is fastened in the ajar or half locked state.

As has been described heretofore, the trajectory of the operation portion 52 of the handle 41 intersects the rear end portion of the swing door 2 which is fastened in the fully closed state or the ajar or half locked state, and in a case that the swing door 2 is fastened in the fully closed state or the ajar or half locked state, the operation portion 52 is brought into abutment with the rear end portion of the swing door 2. This restricts the unlocking operation. However, the swing door 2 which is fastened in the ajar or half locked state is opened slightly compared with the swing door 2 which is fastened in the fully closed state. As a result, the restriction of the unlocking operation becomes less severe in a case that the swing door 2 is fastened in the ajar or half locked state.

However, the second lever 43 has the play stroke θ (refer to FIG. 5) that is defined between: the point in time when the second lever 43 starts to rotate from its initial position; and the point in time when the rotation of the second lever 43 is transmitted to the first lever 42. Even though the stroke of the handle 41 over which the operation portion 52 is brought into abutment with the rear end portion of the swing door 2 is increased as a result of the restriction of the unlocking operation getting less severe, an increase in the stroke of the handle 41 can be absorbed by the play stroke θ of the second lever 43, whereby the transmission of the rotation of the second lever 43 to the first lever 42 therefrom can be cut off. As a result, an unexpected unlocking can be prevented.

In addition, with no unlocking operation performed, the handle 41 and the second lever 43 are retained in their initial positions by the torsion spring 56 which biases the second lever 43. Then, the first lever 42 is retained in its initial position by the torsion spring 28 (refer to FIGS. 2 and 3) which biases the opening lever 27 (refer to FIGS. 2 and 3) of the lower lock device 12 by way of the lower cable 15. The opening lever 27 of the lower lock device 12 is retained in its initial position by, needless to say, the torsion spring 28, and further, the opening lever of the upper lock device 11 is also retained in its initial position by the torsion spring 28 by way of the upper cable 14 and the lower cable 15, as well as the first lever 42. Since the handle 41, the first lever 42, the second lever 43, the opening lever 27, and the opening lever of the upper lock device, which are all movable, are retained in their initial positions as described heretofore, the generation of abnormal noise in the upper lock device 11, the lower lock device 12, and the handle device 13 can be suppressed.

A stroke of the second lever 43 over which the operation portion 52 of the handle 41 is brought into abutment with the rear end portion of the swing door 2 which is left fastened in the ajar or half locked state is preferably set at the play stroke θ of the second lever 43 or smaller. In other words, the pressing portion 55 of the second lever 43 comes into contact with the pressing target portion 57 of the first lever 42 or a gap is caused to remain between the pressing portion 55 and the pressing target portion 57 at the timing at which the operation portion 52 is brought into abutment with the rear end portion of the swing door 2 which is left fastened in the ajar or half locked state. As a result, even though the stroke of the handle 41 defined until the operation portion 52 is brought into abutment with the rear end portion of the swing door 2 increases higher than a designed value and/or the play stroke θ of the second lever 43 decreases lower than a designed value due to an production error, an unexpected unlocking can be prevented in a more ensured fashion in such a state that the swing door 2 is fastened in the ajar or half locked state.

FIG. 8 shows a fixing structure of the handle device 13.

The bracket 40 of the handle device 13 has a plurality of fastening holes 60 and is fixed to a panel 4 of the access door 3 with bolts which are passed through the fastening holes 60. In addition, the bracket 40 has, separately from the fastening holes 60, a projecting portion 61 with which the handle device 13 is temporarily fixed to the panel 4 of the access door 3. The projecting portion 61 is folded into a crank-like configuration in such a manner as to be inserted into a locking hole 62 provided in the panel 4, so that the projecting portion 61 is disposed to extend along a front surface and a rear surface of the panel 4. In addition, the bracket 40 has an upper cable holding portion 63 and a lower cable holding portion 64. The upper cable holding portion 63 holds a terminal end portion 14b of an outer sheath of the upper cable 14, while the lower cable holding portion 64 holds a terminal end portion 15b of an outer sheath of the lower cable 15.

In fixing the handle device 13 to the panel 4, firstly, the upper lock device 11 and the lower lock device 12 are fixed to the access door 3. The upper cable 14 is connected to the upper lock device 11 in advance, while the lower cable 15 is connected to the lower lock device 12 in advance. Subsequently, the terminal end portion 14b of the sheath of the upper cable 14 is held to the upper cable holding portion 63 of the bracket 40. Then, the upper cable 14 is fixed to a clip 65 placed on the panel 4. The handle device 13 is suspended on the upper cable 14 fixed to the panel 4.

Subsequently, the projecting portion 61 of the bracket 40 is inserted into the locking hole 62 in the panel 4. The bracket 40 is suspended on the upper cable 14, and the projecting portion 61 is inserted into the panel 4, whereby the bracket 40 is temporarily fixed to the panel 4. With the bracket 40 temporarily fixed to the panel 4, the fastening holes 60 in the bracket 40 are disposed so as to match, in position, bolt holes 66 in the panel 4. Bolts are passed through the fastening holes 60, whereby the bracket 40 is fixed to the panel 4.

Thus, as has been described heretofore, according to the disclosure of the present specification, there is provided a door opening device for an access door that is provided adjacent to a longitudinal rear side of a swing door opened and closed about a longitudinal front end portion thereof as an axis and is configured to be opened and closed about a longitudinal rear end portion thereof as an axis with the swing door left open, the door opening device including an upper lock device configured to lock an upper striker provided on a body roof portion and having an upper opening lever configured to unlock the locked upper lock device, a lower lock device configured to lock a lower striker provided on a body floor portion and having a lower opening lever configured to unlock the locked lower lock device, and a handle device configured to actuate the upper opening lever and the lower opening lever in an unlocking direction by way of an upper cable connected to the upper opening lever and a lower cable connected to the lower opening lever, the upper lock device and/or the lower lock device has a first bias member configured to bias the upper opening lever and/or the lower opening lever in an opposite direction to the unlocking direction, the handle device has a handle, an unlocking operation to actuate the upper opening lever and the lower opening lever in the unlocking direction being inputted into the handle, a first lever, the upper cable and the lower cable being connected to the first lever, a second lever configured to rotate in a first direction in response to the unlocking operation and to transmit the rotation to the first lever, and a second bias member configured to bias the second lever in a second direction opposite to the first direction to thereby restore the second lever to an initial position, and the second lever has a play stroke defined between a point in time when the second lever starts to rotate from the initial position and a point in time when the rotation is transmitted to the first lever.

In the door opening device according to the disclosure of the present specification, the first lever and the second lever have engagement portions configured to be brought into engagement with each other when the second lever rotates in the first direction in response to the unlocking operation of the handle, and the engagement portion of the first lever and the engagement portion of the second lever are left apart from each other with the second lever placed in the initial position.

In the door opening device according to the disclosure of the present specification, the handle device is provided at a front end portion of the access door, and when the swing door is left in a fully closed state and in an ajar or half locked state, the handle, into which the unlocking operation is inputted, is brought into abutment with a rear end portion of the swing door, and the unlocking operation is restricted by the abutment.

In the door opening device according the disclosure of the present specification, the play stroke is equal to or greater than a stroke of the second lever over which the handle is brought into abutment with the rear end portion of the swing door left in the ajar or half locked state.

In the door opening device according the disclosure of the present specification, the door opening device includes a single bracket configured to support the handle rotatably and to support the first lever and the second lever rotatably and concentrically.

In the door opening device according the disclosure of the present specification, the upper cable is fixed to a panel of the access door, the bracket has an upper cable holding portion configured to hold a terminal end portion of the upper cable, a projecting portion inserted into the panel of the access door, and a plurality of fastening holes through which a bolt is passed, the bracket is temporarily fixed to the panel by the bracket being suspended on the upper cable fixed to the panel and the projecting portion being inserted into the locking hole, and with the bracket temporarily fixed to the panel, the fastening holes in the bracket match, in position, bolt holes in the panel.

REFERENCE SIGNS LIST 1 side door
2 swing door
3 access door
4 panel
10 door opening device
11 upper lock device
12 lower lock device
13 handle device
14 upper cable
15 lower cable
16 lock device
17 door handle
20 body
21 cover plate
22 back plate
24 latch
25 ratchet
26 relay lever
27 opening lever
28 torsion spring (first bias member)
30 striker groove
31 latch shaft
32 ratchet shaft
33 engagement groove
34 engagement portion
35 lever shaft
36 engagement portion
40 bracket
41 handle
42 first lever
43 second lever
50 handle shaft
51 lever shaft
52 operation portion
53 pressing portion
54 pressing target portion
55 pressing portion
56 torsion spring (second bias member)
57 pressing target portion 58 upper cable connecting portion
59 lower cable connecting portion
60 fastening hole
61 projecting portion
62 locking hole
63 upper cable holding portion
64 lower cable holding portion
65 clip
66 bolt hole
S1 upper striker
S2 lower striker
S3 striker
θ play stroke

The invention claimed is:

1. A door opening device for an access door that is provided adjacent to a longitudinal rear side of a swing door opened and closed about a longitudinal front end portion thereof as an axis and is configured to be opened and closed about a longitudinal rear end portion thereof as an axis with the swing door left open, the door opening device comprising:
an upper lock device configured to lock an upper striker provided on a body roof portion and having an upper opening lever configured to unlock the locked upper lock device;
a lower lock device configured to lock a lower striker provided on a body floor portion and having a lower opening lever configured to unlock the locked lower lock device; and
a handle device configured to actuate the upper opening lever and the lower opening lever in an unlocking direction by way of an upper cable and a lower cable, the upper cable being connected to the upper opening lever, and the lower cable being connected to the lower opening lever,
wherein the upper lock device and/or the lower lock device comprises a first bias member configured to bias the upper opening lever and/or the lower opening lever in an opposite direction to the unlocking direction,
wherein the handle device comprises:
a handle, an unlocking operation to actuate the upper opening lever and the lower opening lever in the unlocking direction being inputted into the handle, the handle comprises a pressing portion;
a first lever, the upper cable and the lower cable being connected to the first lever, the first lever comprises a pressing target portion;
a second lever comprising a pressing portion and a pressing target portion and configured to rotate in a first direction in response to the unlocking operation and to transmit the rotation to the first lever when the pressing portion of the second lever contacts the pressing target portion of the first lever; and
a second bias member configured to bias the second lever in a second direction opposite to the first direction to thereby restore the second lever to an initial position, and
wherein in the initial position, the pressing portion of the handle and the pressing target portion of the second lever are in contact with each other, while the pressing portion of the second lever and the pressing target portion of the first lever are spaced apart, so that when the unlocking operation is inputted into the handle, the second lever rotates immediately due to the contact between the pressing portion of the handle and the pressing target portion of the second lever in the initial position, while the first lever starts a rotation only after the second lever rotates from the initial position into a second position, in which the pressing portion of the second lever and the pressing target portion of the first lever are brought into engagement with each other,
so that the second lever has a play stroke defined between a first point in time when the second lever starts to rotate from the initial position, and a second point in time when the pressing portion of the second lever and the pressing target portion of the first lever are brought into engagement with each other in the second position, the play stroke of the second lever being greater than a play of the handle.

2. The door opening device according to claim 1,
wherein the handle device is provided at a front end portion of the access door,
wherein the handle has an operation portion that is disposed on the transversely inner side of the access door in such a manner as to be exposed therefrom, and
wherein when the swing door is left in a fully closed state or in an ajar or half locked state, the operation portion of the handle, into which the unlocking operation is inputted, is brought into abutment with a rear end portion of the swing door, and the unlocking operation is restricted by the abutment.

3. The door opening device according to claim 2,
wherein the play stroke is equal to or greater than a stroke of the second lever over which the handle is brought into abutment with the rear end portion of the swing door left in the ajar or half locked state.

4. The door opening device according to claim 1, further comprising:
a single bracket configured to support the handle rotatably and to support the first lever and the second lever rotatably and concentrically.

5. The door opening device according to claim 4,
wherein the upper cable is fixed to a panel of the access door,
wherein the bracket comprises:
an upper cable holding portion configured to hold a terminal end portion of the upper cable; and
a projecting portion inserted into the panel of the access door,
wherein the bracket has a plurality of fastening holes through which a bolt is passed,
wherein the bracket is temporarily fixed to the panel by the bracket being suspended on the upper cable fixed to the panel and the projecting portion being inserted into a locking hole, and
wherein with the bracket temporarily fixed to the panel, the fastening holes in the bracket match, in position, bolt holes in the panel.

6. The door opening device according to claim 1, wherein the first lever is disposed concentrically with the second lever on a lever shaft and that both the first lever and the second lever are rotatable around a common axis provided by the lever shaft.

7. The door opening device according to claim 1,
wherein the handle device includes a bracket, and
wherein the bracket holds:
a handle shaft being a rotational shaft of the handle and extending in a first direction; and
a lever shaft being a common rotational shaft for the first lever and the second lever and extending in a second direction, which is different from the first direction.

* * * * *